US012738085B2

(12) United States Patent
Gong et al.

(10) Patent No.: US 12,738,085 B2
(45) Date of Patent: Sep. 15, 2026

(54) PADDING SENSITIVE BATCH CONSTRUCTION FOR TEXT RECOGNITION

(71) Applicant: Oracle International Corporation, Redwood Shores, CA (US)

(72) Inventors: Liyu Gong, Lexington, KY (US); Yuying Wang, Redmond, WA (US); Michael Avendi, Irvine, CA (US); Tao Sheng, Bellevue, WA (US); Jun Qian, Bellevue, WA (US)

(73) Assignee: Oracle International Corporation, Campbell, CA (US)

( * ) Notice: Subject to any disclaimer, the term of this patent is extended or adjusted under 35 U.S.C. 154(b) by 214 days.

(21) Appl. No.: 18/544,973

(22) Filed: Dec. 19, 2023

(65) Prior Publication Data

US 2025/0201012 A1 Jun. 19, 2025

(51) Int. Cl.
*G06V 30/414* (2022.01)
*G06V 30/14* (2022.01)
*G06V 30/19* (2022.01)

(52) U.S. Cl.
CPC ........ *G06V 30/414* (2022.01); *G06V 30/1444* (2022.01); *G06V 30/19013* (2022.01)

(58) Field of Classification Search
CPC ............. G06V 30/414; G06V 30/1444; G06V 30/19013; G06V 30/10; G06V 30/148
See application file for complete search history.

(56) References Cited

U.S. PATENT DOCUMENTS 9,043,349 B1 * 5/2015 Lin ........................ G06V 20/62 704/235
11,416,672 B2 * 8/2022 Morariu ................. G06N 5/046
11,941,349 B1 * 3/2024 Vu ..................... G06V 30/2455
11,978,273 B1 * 5/2024 Ramaswamy ....... G06V 30/412
12,249,168 B2 * 3/2025 Azulai ............. G06V 30/19173
12,360,654 B1 * 7/2025 Batool Zaidi ......... G06F 3/0486
2014/0172408 A1 * 6/2014 Vukosavljevic ........ G06F 40/58 704/2
2022/0309279 A1 * 9/2022 Biswas .................. G06V 20/42
2023/0066906 A1 * 3/2023 Ghosh .................. G06V 10/761
2023/0115091 A1 * 4/2023 Horvay .................. G06V 10/82 382/123
2024/0153296 A1 * 5/2024 Dong ................. G06V 30/1916
2024/0428605 A1 * 12/2024 Li ........................ G06V 30/414
2025/0005944 A1 * 1/2025 Nanawati ............. G06V 30/148
2025/0265812 A1 * 8/2025 Hansson .............. G06V 10/764
2026/0030448 A1 * 1/2026 Sapra .................... G06F 40/279

* cited by examiner

*Primary Examiner* — Mia M Thomas
(74) *Attorney, Agent, or Firm* — Hickman Becker Bingham Ledesma LLP

(57) ABSTRACT

Techniques for constructing padding-sensitive batches for text recognition are provided. In one technique, a first bounding box from a list of bounding boxes is added or included into a batch of zero or more bounding boxes. Each bounding box in the list of bounding boxes surrounds different detected text in a digital image. A second bounding box is identified from the list. The second bounding box is wider than the first bounding box. A difference between (1) a width of the second bounding box and (2) a particular width is determined. The particular width is based on a width of a bounding box in the batch. Based on the difference and a threshold value, it is determined whether to include the second bounding box in the batch. The batch is then input into a test recognition model.

20 Claims, 7 Drawing Sheets

Figure 6:
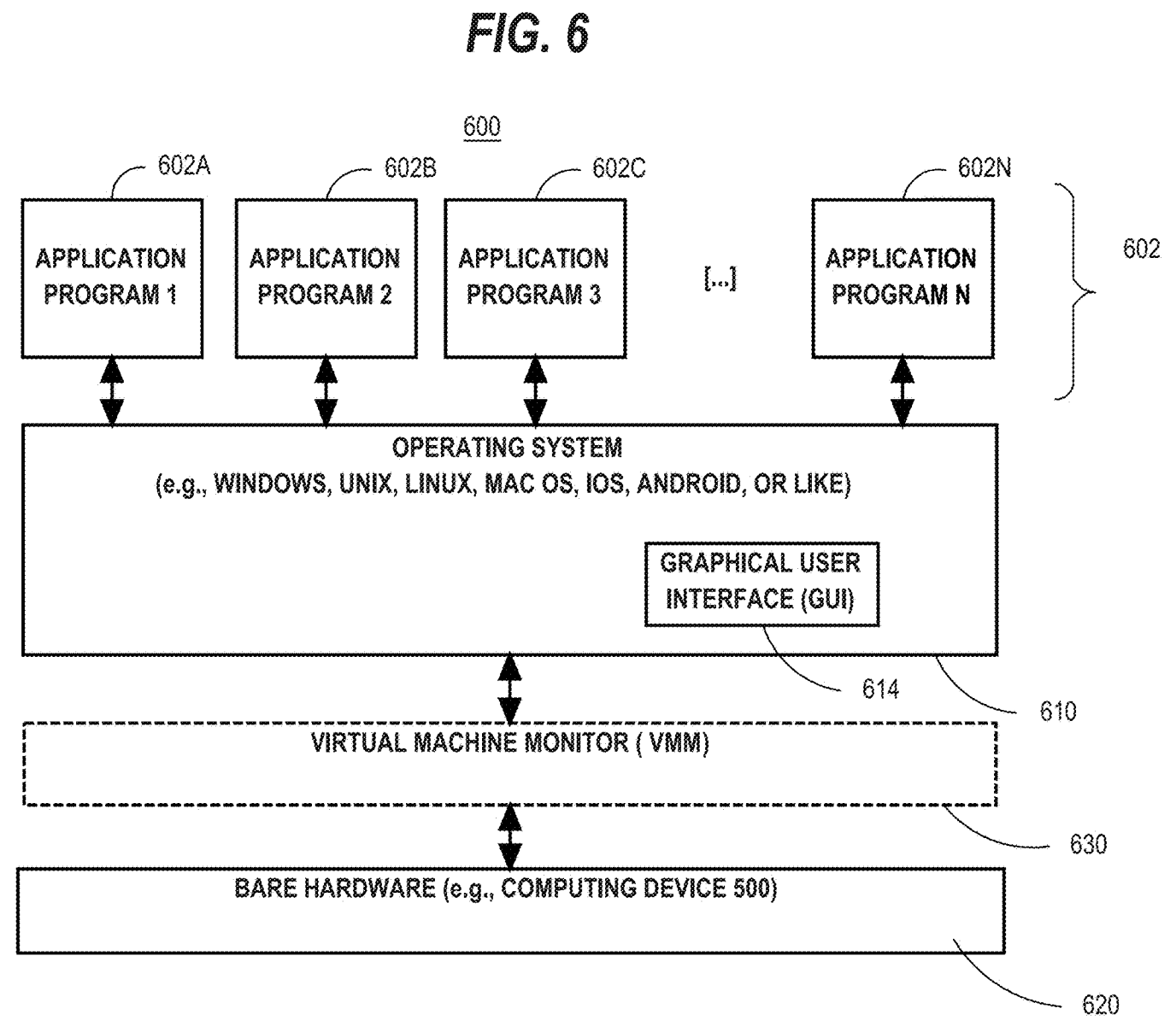

602A
APPLICATION PROGRAM 1

602B
APPLICATION PROGRAM 2

602C
APPLICATION PROGRAM 3

[...]

602N
APPLICATION PROGRAM N

610
OPERATING SYSTEM
(e.g., WINDOWS, UNIX, LINUX, MAC OS, IOS, ANDROID, OR LIKE)

614
GRAPHICAL USER INTERFACE (GUI)

630
VIRTUAL MACHINE MONITOR ( VMM)

620
BARE HARDWARE (e.g., COMPUTING DEVICE 500)

PADDING SENSITIVE BATCH CONSTRUCTION FOR TEXT RECOGNITION

TECHNICAL FIELD

The present disclosure relates to text recognition and, more particularly to, constructing batches of text for text recognition.

BACKGROUND

Optical Character Recognition (OCR) is a computer technology that recognizes text within a digital image. In a typical OCR pipeline, a text detection model locates the text within input images (which may include non-text data) and outputs bounding boxes, or boxes that surround the text. The detected text lines are then grouped into batches. A text recognition model transcribes text lines batch by batch instead of line by line, which can speed-up the overall OCR process.

However, short lines in a batch need to be padded to the same length as the longest line in the same batch. Padding can hurt the accuracy of text recognition, especially when the text recognition model is a recurrent neural network, such as Convolutional Recurrent Neural Network (CRNN). Incorrect text recognition can have detrimental effects, especially in the technical context and the financial context.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6 is a block diagram of a basic software system that may be employed for controlling the operation of the computer system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for constructing batches of text for text recognition. In one technique, a plurality of bounding boxes is detected in a digital image. The plurality of bounding boxes is sorted based on width to generate a sorted list of bounding boxes. A first bounding box from the sorted list is included into a batch of bounding boxes. A second bounding box from the sorted list is identified, where the second bounding box is wider than the first bounding box. A difference between the width of the second bounding box and a width of another bounding box is determined. Based on the difference and a threshold value, it is determined whether to include the second bounding box in the batch.

Embodiments improve computer-related technology involve text recognition. Specifically, embodiments involving batching bounding boxes based on width differences improves accuracy (including precision and recall) and reduces recognition errors.

System Overview

Figure 1:
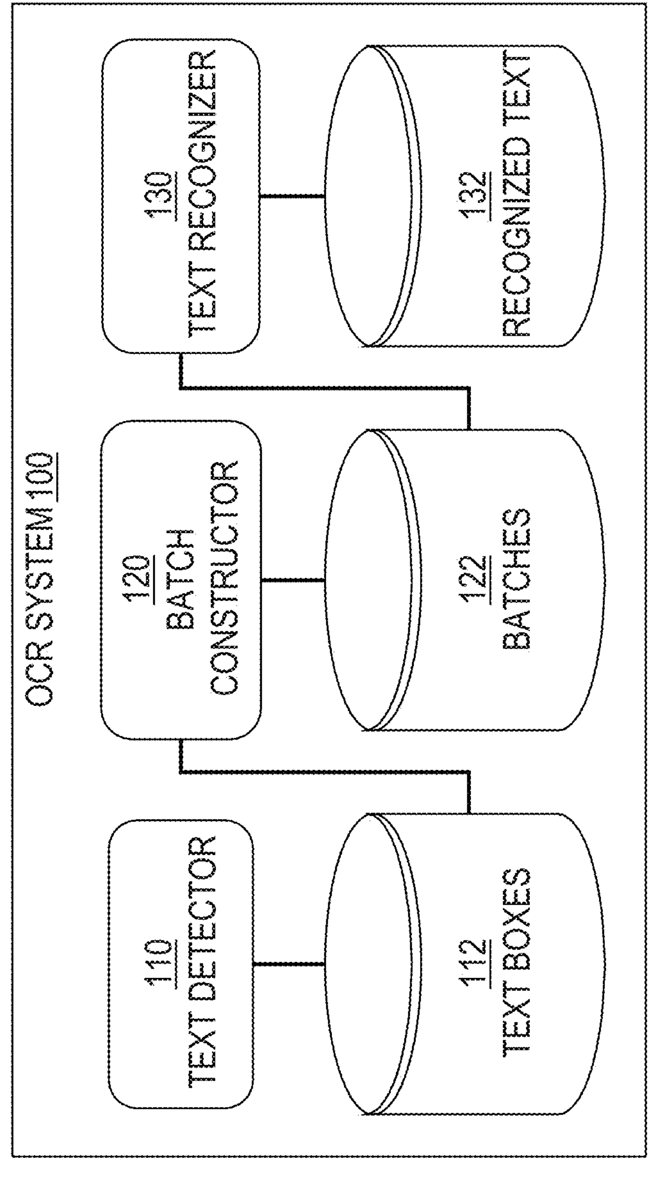
FIG. 1 is a block diagram that depicts an example system for text recognition, in an embodiment.

FIG. 1 is a block diagram that depicts an example system 100 for text recognition, in an embodiment. System 100 comprises a text detector 110, a batch constructor 120, and a text recognizer 130. Each of text detector 110, batch constructor 120, and text recognizer 130 may be implemented in software, hardware, or any combination of software and hardware.

System 100 may be a service hosted in a cloud system (that comprises other systems or services) where users can upload digital images and system 100 can output digital text (not just images thereof) that is selectable and modifiable. Digital images may be scanned images of physical documents, such as receipts and invoices, or may be screenshots of physical documents or of computer screens. Thus, a digital image may be generated by a scanning device or a digital camera.

Text detector 110 locates text in a digital image and outputs multiple bounding boxes of text lines (hereinafter "bounding boxes" or "lines"). Each bounding box surrounds or contains a line of text detected within the digital image. The shape of each bounding box may be a rectangle. The line of text contained within each bounding box comprises multiple characters, such as alphanumeric characters (i.e., letters and numbers) and/or other text symbols in one or more languages (such as English, Chinese, Greek, and/or Latin). Because different text within a document may have different font sizes, each bounding box may have a different width and a different height, which may be measured in pixels. Each bounding box may be defined by two or four points, each point specifying a location within the digital image. For example, a point may be defined as an x coordinate and a y coordinate ({x, y}) and an origin point in the digital image may be one of the corners of the digital image, such as the bottom lefthand corner.

Batch constructor 120 groups bounding boxes (that text detector 110 outputs) into multiple batches. For each batch, batch constructor 120 adds padding to one or more bounding boxes in a batch. Padding comprises a rectangle of fixed value pixels (either black, white or gray) that are appended to a bounding box in order to change the length of the bounding box in order to be equal to the longest bounding box in a batch. Therefore, if there are three bounding boxes of different lengths in a batch, then two paddings of different lengths are added to the shorter bounding boxes such that all three bounding boxes, after the paddings are added, have the same length. Thus, batch constructor 120 ensures that the bounding boxes in a single batch have the same length, but different batches may have sets of bounding boxes with different lengths.

Text recognizer 130 is a text recognition model that processes the batches (outputted by batch constructor 120) one by one to transcribe the text content of each bounding box of each batch. Text recognizer 130 may comprise a neural network or other machine-learned model that has been trained using one or more machine learning techniques.

Resizing

In an embodiment, batch constructor 120 (or text detector 110, or another component of system 100) resizes bounding boxes prior to the text of those bounding texts being recognized by text recognizer 130). Different bounding boxes associated with a digital image may have different heights, such as one bounding box being 28 pixels in height and another bounding box being 25 pixels in height.

Resizing bounding boxes involves equalizing (or normalizing) the heights of the bounding boxes. Resizing a bounding box to have a different height may be performed while the aspect ratio the same, which means that the width of the bounding box will change.

Resizing may be performed by identifying the bounding box with the highest height and resizing all other bounding boxes to have that same height. Alternatively, a bounding box with the median height is identified and all other bounding boxes associated with the same digital image are resized to have that same height. Alternatively, there may be a default height and all bounding boxes that do not have that default height are resized to that height. It is advantageous to keep the height of all bounding boxes the same to enable optimization of the neural network, increasing accuracy.

Padding Example

Figure 2:
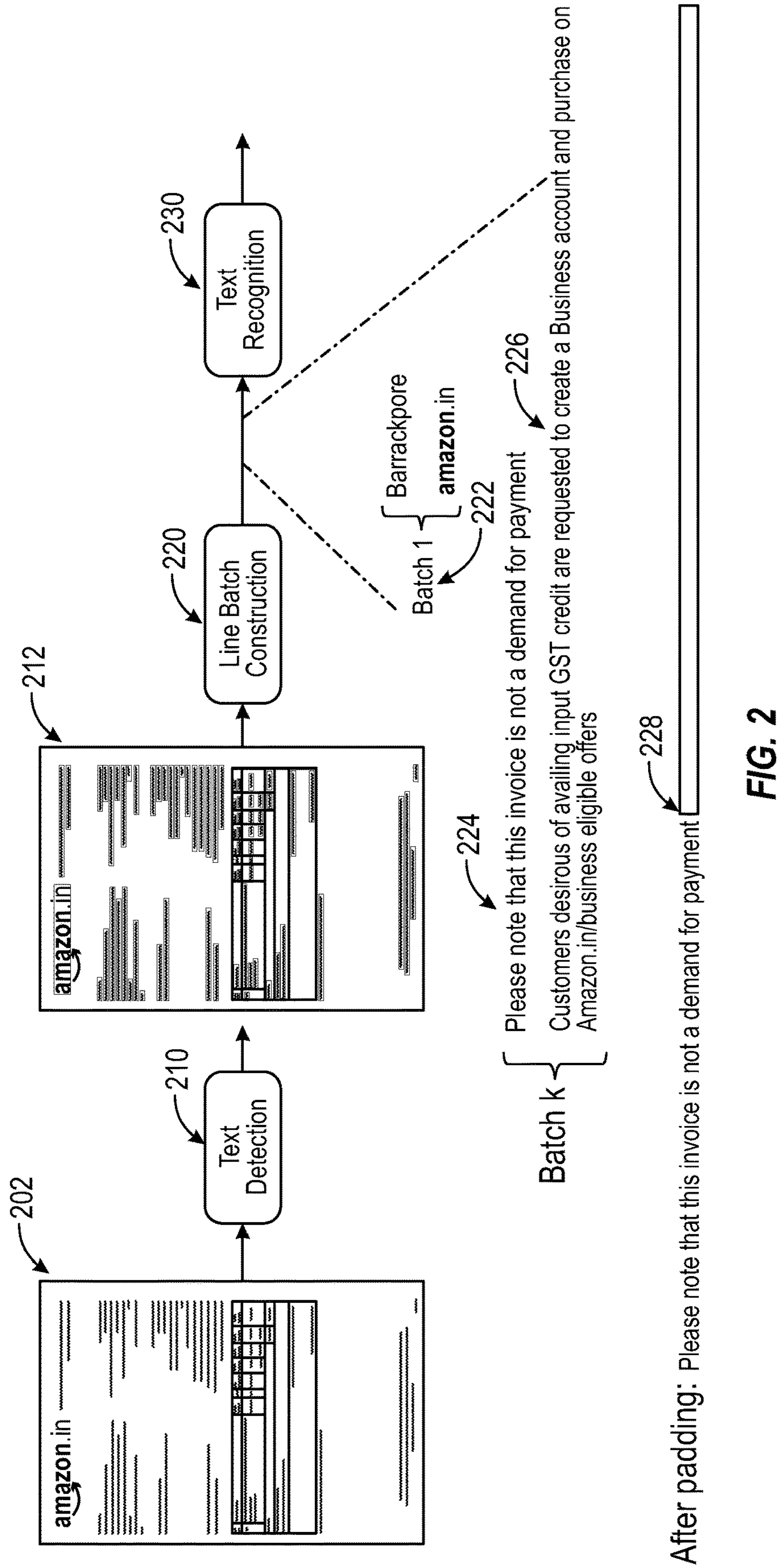
FIG. 2 is a block diagram that depicts an example process for extracting text from a digital image.

FIG. 2 is a block diagram that depicts an example process 200 for extracting text from a digital image. Process 200 begins with text detection component 210 (corresponding to text detector 110) receiving a digital image 202 and analyzing digital image 202 in order to detect digital text in digital image 202. Text detection component 210 outputs a marked-up version 212 of digital image 202. The marked-up version includes bounding boxes around the detected digital text. Thereafter, line batch construction component 220 (corresponding to batch constructor 120) receives marked-up version 212 as input and batches (or groups) the bounding boxes therein according to one or more criteria. For example, line batch construction component 220 creates batches of a fixed number of lines, such as five bounding boxes or lines, in order of appearance in marked up-version 212. The process of identifying lines for each batch may be from top left to top right down to bottom left to bottom right, or may be randomly selected from the set of bounding boxes.

In the depicted example, batch 222 includes two bounding boxes and batch k includes bounding boxes 224 and 226. Because bounding box 224 is shorter than bounding box 226, line batch construction component 220 adds padding 228 to bounding box 224 such that bounding boxes 224 and 226 are equal in left afterwards. In this example, padding 228 is greater than the length of original bounding box 224, which may cause text recognition component 230 to recognize incorrect text.

After line batch construction component 220 generates one or more batches, text recognition component 230 (which corresponds to text recognizer 130) receives the one or more batches as input and recognizes the text within each bounding box of the batch. A bounding box in a batch has an impact on how well text recognition component 230 recognizes text in another bounding box in the same batch.

Padding Sensitive Batching

Figure 3:
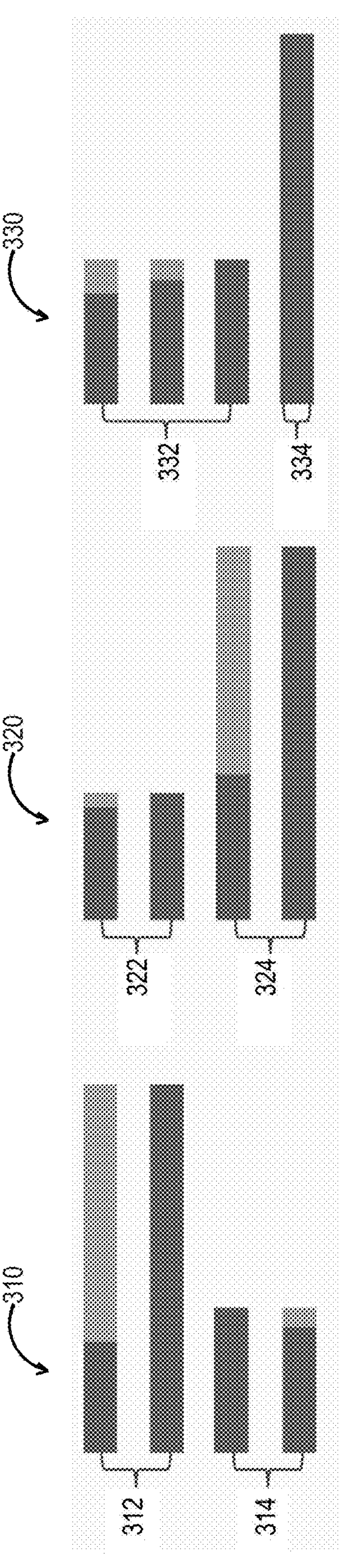
FIG. 3 is a block diagram that depicts the results of different batching techniques.

FIG. 3 is a block diagram that depicts the results of different batching techniques. Each of results 310-330 includes the same four bounding boxes and each includes two batches, although, in production, each technique may result in a very different number of batches given the same set of bounding boxes. For example, given a digital image comprising one hundred bounding boxes, one technique may generate twenty batches while another technique generates thirty batches.

Result 310 is from a technique referred to as "random fixed-size batching" where each constructed batch is the same size. However, the manner of assigning a bounding box to a batch may be random or simply selecting the next bounding box (to the extent there is ordering of bounding boxes) from a text-detected digital image. In this example, batch 312 includes two bounding boxes and batch 314 includes two bounding boxes. The top bounding box in batch 312 is associated with an amount of padding that exists the width of the original bounding box.

Result 320 is from a technique referred to as "sorted fixed-size batching" where each constructed batch is the same size. However, before any batch is created for a digital image, the bounding boxes that are detected in the digital image are sorted from shortest to longest or longest to shortest. In this example, batch 322 includes two bounding boxes and batch 324 includes two bounding boxes. Also, each bounding box in batch 322 is smaller than each bounding box in batch 324. However, both results 310 and 320 include a significant amount of padding in one of their respective batches. For example, similar to batch 312, the top bounding box in batch 324 is associated with an amount of padding that exists the width of the original bounding box.

Result 330 is from an embodiment described herein referred to as "padding sensitive batching." Before generating batches (or including/assigning bounding boxes to batches), batch constructor 120 sorts bounding boxes that text detector 110 generates for a digital image. Batch constructor 120 assigns a current bounding box to a current batch based on the size of the current bounding box and one or more other bounding boxes already assigned to the current batch. For example, if there is a threshold difference between the size or length of the current bounding box and the size or length of the first (or shortest) bounding box assigned to the batch, then the current batch is "locked" (meaning no more bounding boxes) and batch constructor 120 assigns the current bounding box to a new, empty batch (i.e., one that did not previously include any bounding boxes). The amount of padding in result 330 is significantly less than the paddings in results 310 and 320.

Process Overview

Figure 4A:
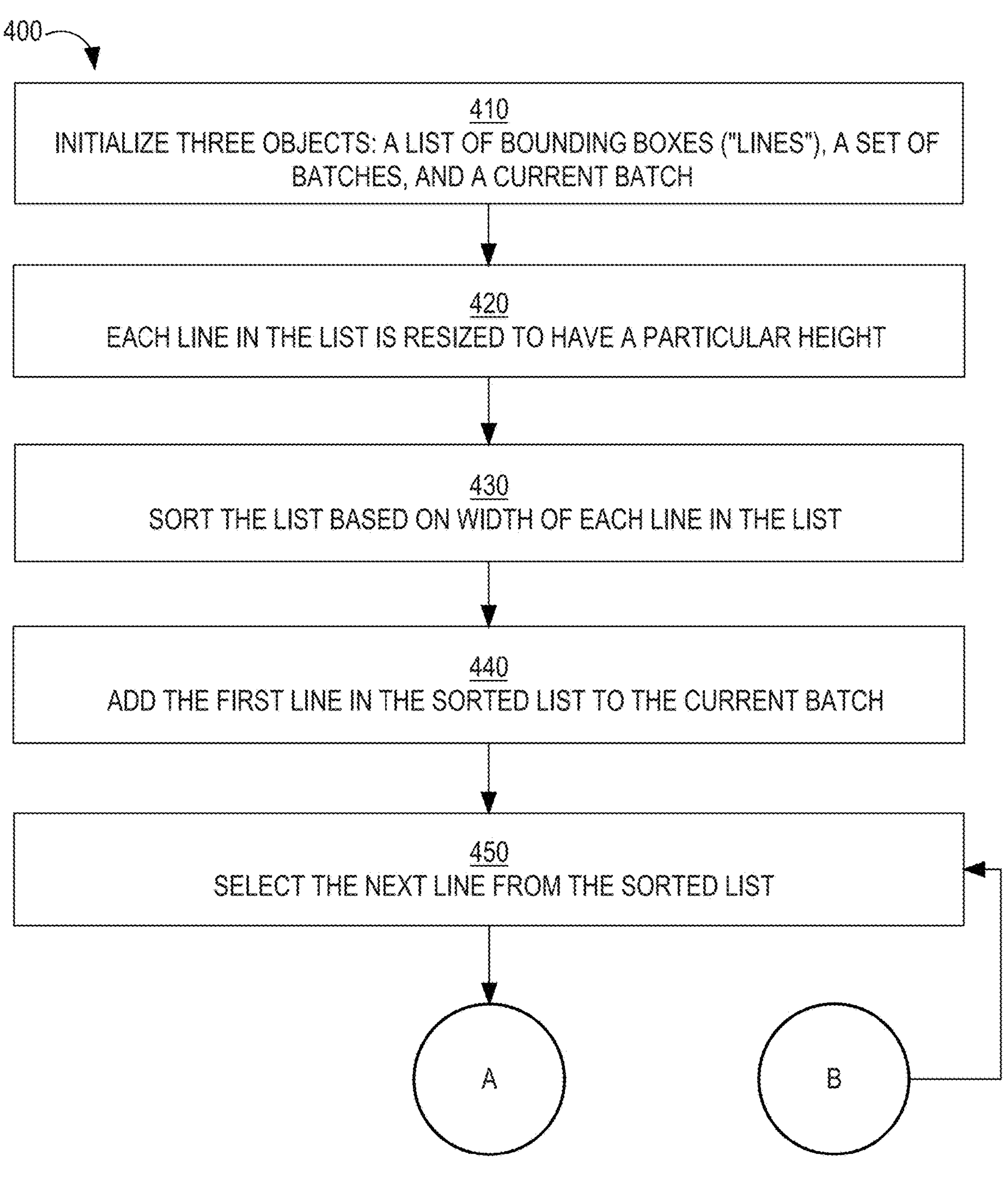
FIGS. 4A-4B is a flow diagram that depicts an example process for constructing batches, in an embodiment.
Figure 4B:
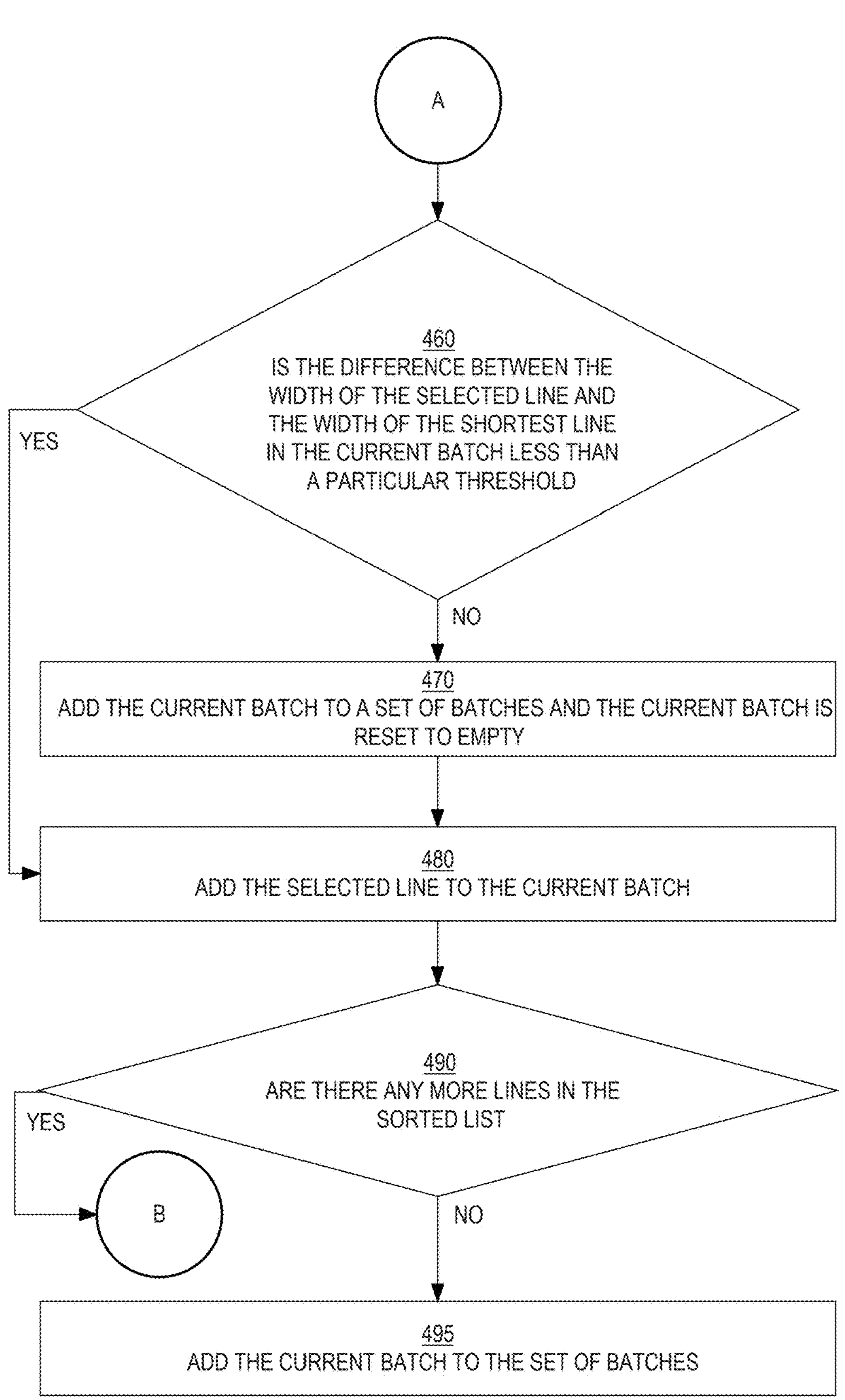

FIGS. 4A-4B is a flow diagram that depicts an example process 400 for constructing batches, in an embodiment. Process 400 may be implemented by batch constructor 120.

At block 410, three objects are initialized: a list that comprises bounding boxes (or lines) detected by text detector 110, an empty set of batches, and an empty batch representing a current batch. These are software objects that may be created in one implementation. Other implementations may involve different software objects to keep track of bounding boxes and batches.

At block 420, each line in the list is resized to have a particular height (e.g., in pixels). In a related embodiment, text detector 110 performs block 420. Block 420 is performed for text recognition components that require lines to be the same height.

At block 430, the list is sorted based on width of each line in the list. For example, the list may be sorted in ascending order (in which lines with shorter widths are ordered before lines with longer widths) or in descending order (in which lines with longer widths are ordered before lines with shorter widths).

At block 440, the first line in the sorted list is added to the current batch. Thus, if the list is sorted in ascending order, then the first line is the shortest line in the list. If the list is sorted in descending order, then the first line is the longest line in the list.

At block 450, the next line from the sorted list is selected. In the first iteration of block 450, the selected line is the second smallest line in the list (if the list is sorted in ascending order) or the second longest line in the list (if the list is sorted in descending order).

At block 460, it is determined whether a difference between the width of the selected line and the shortest line (if the list is sorted in ascending order) in the current batch is less than a particular threshold. Thus, block 460 involves identifying the width of the selected line, identifying the width of the shortest line in the current batch, and performing a comparison between the two. The value of the particular threshold may be a default value or may be a value selected by a user or administrator of computer system 100. If the determination in block 460 is negative, then process 400 proceeds to block 470; else, process 400 skips to block 480.

At block 470, the current batch (or a copy thereof) (meaning all the lines in the current batch) is added to a set of batches (which is initially empty) and the current batch is reset to empty. Block 470 may also involve, before resetting the current batch, adding padding to each line, in the current batch, that is not the longest line in the current batch. The padding added to a line may be of different length than the length of each other padding that is added to another line in the current batch. Each padding is added to ensure that the length of the padded line equals the width of the longest line in the current batch.

At block 480, the selected line is added to the current batch. If block 480 is performed immediately after block 470, then the current batch only includes the selected line.

At block 490, it is determined whether there are any more lines in the sorted list. If so, then process 400 returns to block 450. Otherwise, process 400 proceeds to block 495.

At block 495, the current batch (if not empty) is added to the current set of batches. The current batch at this point may have a single line or multiple lines.

After multiple iterations of block 490 with respect to a single sorted list, there may be multiple, even many, batches in the set of batches. Also, multiple batches may have a different number of lines assigned to the batch. In other words, embodiments produce variable-sized batches while past approaches produced fixed-sized batches. It is possible to send a complete batch directly to text recognizer 130 without waiting for other batches from the same sorted list to be formed. This technique increases parallelism.

Line Assignment Criteria

In process 400, the criterion for assigning a selected line to a current batch is whether a difference between the width of the selected line and the width of the shortest line in the current batch is less than a particular threshold. In a related embodiment, one or more other criteria are used, either additionally with the above criterion, or alternatively to the above criterion. For example, the width of a selected line may be compared to a particular width that is based on multiple widths of other lines in the current batch. The particular width may be an aggregated width, such as a mean/average width, the median width, or other percentile width. For example, if the width of the first line in the current batch is eight units and the width of the second line in the current batch is ten units, then the average width is nine units.

The aggregated width may be a width that is based on the width of a limited number of lines in a current batch rather than based on the width of all the lines in the current batch, such as the first two or three lines that were added to the current batch or the most recent two or three lines that were added to the current batch; however, this latter approach might result in large batches with significant differences between the shortest line and the longest line in the current batch.

In a related embodiment, instead of comparing the width of a selected line with an aggregated width (that is based on multiple widths), multiple differences based on the width of the selected line are computed and aggregated and then the aggregated difference is compared to a threshold value. For example, a first difference is computed between the width of the selected line and the width of the first line in a current batch and a second difference is computed between the width of the selected line and the width of the second line in the current batch. The two differences are averaged and the resulting average is compared to a threshold value.

In a related embodiment, another line assignment criterion involves comparing a cumulative padding to a threshold value. If the cumulative padding associated with a current batch is less than the threshold value, then the selected line is added to the current batch. The cumulative padding is the sum of the differences between the width of the selected line and the width of each line in the current batch. Thus, the cumulative padding would be the total amount of padding that would have to be added to lines in a batch if the selected line is added to the batch.

In an embodiment, a line assignment criterion that may be used in addition to one of the other line assignment criteria described herein is size of the current batch. For example, once a batch is assigned five lines, then the batch is added to the set of complete batches and the next line in the sorted list is added to a new batch, even though the next selected line could be added to the batch using one or more of the above line assignment criteria.

In an embodiment, instead of sorting the list of lines, a first line in the list is added to a first batch and a second line is selected from the list (either randomly or the next line in the list) and its width is compared to the first line. If the difference in widths is below a particular threshold, then the second line is added to the first batch; otherwise, a second (empty) batch is generated and the second line is added to the second batch. A third line is selected from the list and the process repeats except that is the difference in widths of the third line and the first line is greater than the particular threshold, then width of the third line is compared to the width of the second line. If the difference in those two widths is below the particular threshold, then the third line is added to the second batch; otherwise, a third batch is generated and the third line is added to the third batch. The process repeats until each line in the list is processed and assigned to one of the batches.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
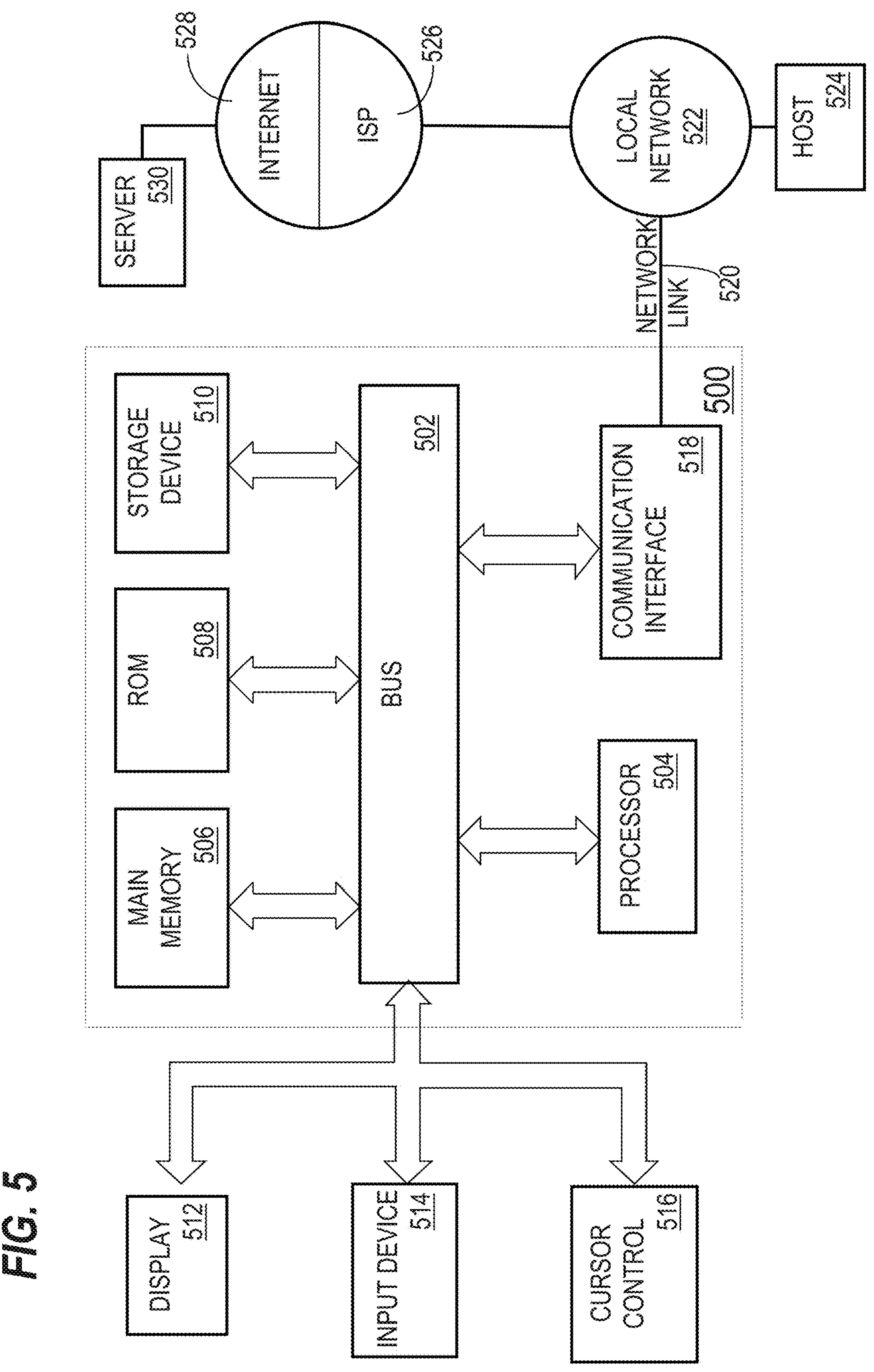
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

including, into a batch of zero or more bounding boxes, a first bounding box from a list of bounding boxes, wherein each bounding box in the list of bounding boxes surrounds different detected text in a digital image;

identifying a second bounding box, from the list of bounding boxes, that is wider than the first bounding box;

after including the first bounding box into the batch, determining a difference between a width of the second bounding box and a particular width that is based on a width of a bounding box in the batch;

based on the difference and a threshold value, determining whether to include the second bounding box in the batch;

inputting the batch into a text recognition model;

wherein the method is performed by one or more computing devices.

2. The method of claim 1, further comprising:

sorting the list of bounding boxes based on width to generate a sorted list of bounding boxes.

3. The method of claim 1, wherein determining whether to include the second bounding box in the batch comprises:

comparing the difference to the threshold value;

including the second bounding box in the batch if the difference is less than the threshold value.

4. The method of claim 1, wherein determining whether to include the second bounding box in the batch comprises:

comparing the difference to the threshold value;

creating a new batch and including the second bounding box in the new batch if the difference is greater than the threshold value.

5. The method of claim 1, wherein the second bounding box immediately follows the first bounding box in the list.

6. The method of claim 1, wherein the bounding box is the first bounding box.

7. The method of claim 1, wherein:

prior to including the first bounding box into the batch, the batch includes one or more bounding boxes;

the particular width is based on multiple widths of multiple bounding boxes in the batch.

8. The method of claim 7, further comprising:

performing an aggregation operation on the multiple widths to generate the particular width.

9. The method of claim 8, wherein the aggregation operation is one of mean, median, maximum, minimum, or percentile.

10. The method of claim 1, wherein the list of bounding boxes is a plurality of bounding boxes, further comprising:

resizing a subset of the plurality of bounding boxes to have a particular height.

11. One or more non-transitory storage media storing instructions which, when executed by one or more computing devices, cause:

including, into a batch of zero or more bounding boxes, a first bounding box from a list of bounding boxes, wherein each bounding box in the list of bounding boxes surrounds different detected text in a digital image;

identifying a second bounding box, from the list of bounding boxes, that is wider than the first bounding box;

after including the first bounding box into the batch, determining a difference between a width of the second bounding box and a particular width that is based on a width of a bounding box in the batch;

based on the difference and a threshold value, determining whether to include the second bounding box in the batch;

inputting the batch into a text recognition model.

12. The storage media of claim 11, wherein the instructions, when executed by the one or more computing devices, further cause:

sorting the list of bounding boxes based on width to generate a sorted list of bounding boxes.

13. The storage media of claim 11, wherein determining whether to include the second bounding box in the batch comprises:

comparing the difference to the threshold value;

including the second bounding box in the batch if the difference is less than the threshold value.

14. The storage media of claim 11, wherein determining whether to include the second bounding box in the batch comprises:

comparing the difference to the threshold value;

creating a new batch and including the second bounding box in the new batch if the difference is greater than the threshold value.

15. The storage media of claim 11, wherein the second bounding box immediately follows the first bounding box in the list.

16. The storage media of claim 11, wherein the bounding box is the first bounding box.

17. The storage media of claim 11, wherein:

prior to including the first bounding box into the batch, the batch includes one or more bounding boxes;

the particular width is based on multiple widths of multiple bounding boxes in the batch.

18. The storage media of claim 17, wherein the instructions, when executed by the one or more computing devices, further cause:

performing an aggregation operation on the multiple widths to generate the particular width.

19. The storage media of claim 18, wherein the aggregation operation is one of mean, median, maximum, minimum, or percentile.

20. The storage media of claim 11, wherein the list of bounding boxes is a plurality of bounding boxes, wherein the instructions, when executed by the one or more computing devices, further cause:

resizing a subset of the plurality of bounding boxes to have a particular height.

* * * * *